INVENTOR.
PAUL HENRI ACLOQUE
BY Bauer and Seymour
ATTORNEYS

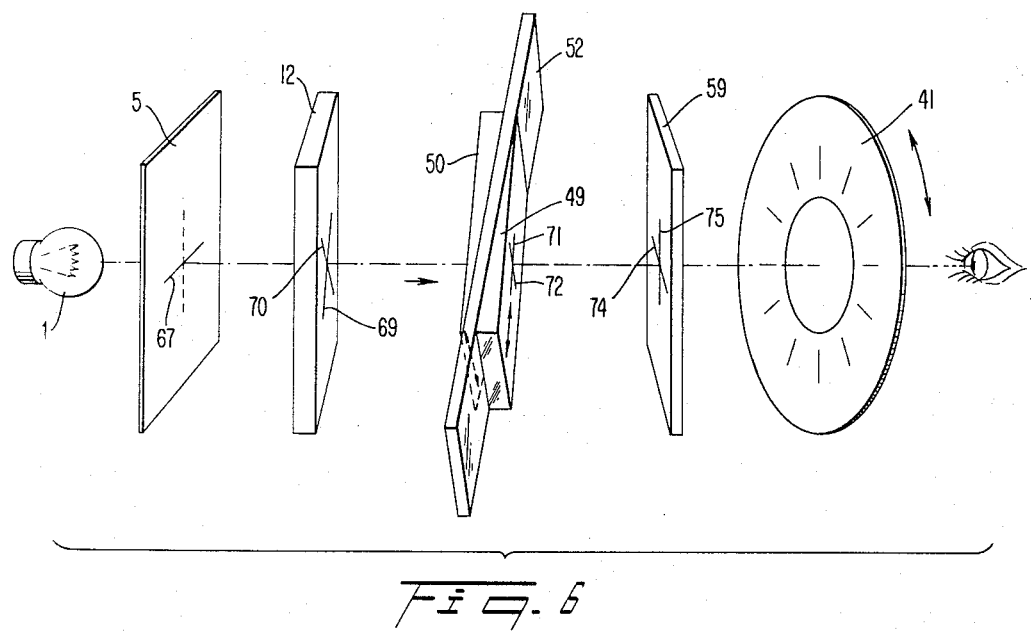
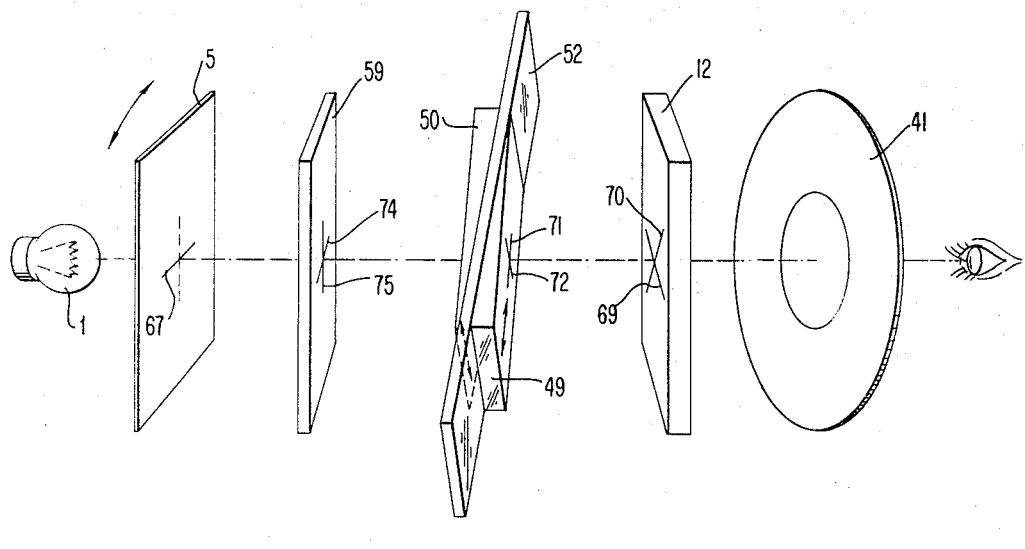

3,345,905
APPARATUS FOR MEASURING PHASE DIFFER-
ENCES IN POLARIZED LIGHT
Paul Henri Acloque, Paris, France, assignor to Compagnie
de Saint-Gobain, Neuilly-sur-Seine, France
Filed Dec. 26, 1961, Ser. No. 162,145
Claims priority, application France, Dec. 27, 1960,
848,054
4 Claims. (Cl. 88—14)

This invention relates to apparatus for measuring differences in phase of principal vibrations of a beam of polarized light, and more particularly the measuring of birefringences.

The invention has among its objects the provision of improved apparatus for measuring differences in phase of principal vibrations of a beam of polarized light.

A further object of the invention lies in the provision of apparatus of the character indicated, wherein such differences in phase may be accurately and directly determined.

A still further object of the invention lies in the provision of apparatus of the character indicated which may be readily employed in existing apparatus for measuring differences in phase of vibrations of a beam of polarized light.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts through the several views, FIG. 1 is a view in vertical axial section through an optical apparatus for measuring differences in phase of principal vibrations of a beam of polarized light, such apparatus incorporating the apparatus of the present invention, certain of the elements of the apparatus of FIG. 1 being shown in side elevation;

FIG. 6 is a schematic view of a first embodiment of optical train in accordance with the present invention; and FIG. 7 is a schematic view of a second embodiment of optical train in accordance with the present invention.

Figure 1:
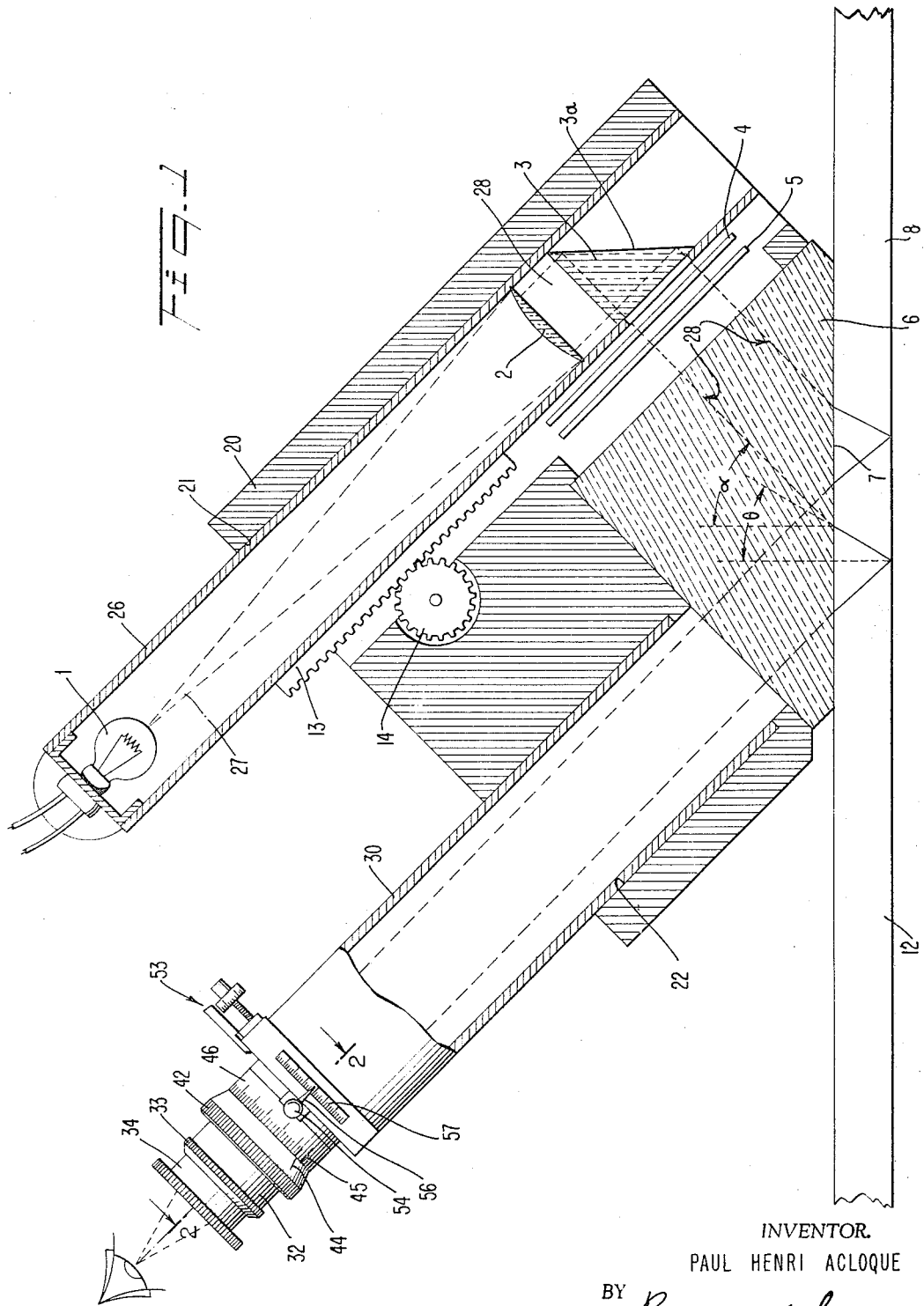

In the usual procedures for measuring differences in phase of principal vibrations of a beam of polarized light, there are utilized elements known as compensators which allow the measurement of the differences in optical path between the components of a beam of polarized light, such difference in optical path being fixed or arbitrarily variable and its value being predetermined as functions of measurable parameters.

One of the best known of such compensators is the Babinet compensator which is made of two thin wedges or prisms of small angle which are cut from quartz plates. One wedge is cut so that the crystal axis lies in a line parallel to the edge of such wedge; the other wedge is cut in such manner that the crystal axis lies normal to the edge of such wedge. The directions of vibration along which the light divides in passing through such prisms are such that one is parallel to and the other is perpendicular to the edge of the wedges.

When, during the travel of the luminous beam, the thickness through which the beam passes is the same at each prism, the resulting difference of phase is zero. Such compensator is generally utilized between crossed polarizer and analyzer, such elements being oriented in such fashion that the common principal line of the prisms is at an angle of 45° with respect to the directions of polarization and of analysis.

The disposition of the crossed polarizer and analyzer without the interposition between them of an element which introduces a differences in optical path yields a black field. The introduction of the Babinet compensator produces a difference in optical path except in those zones wherein the thickness of the two prisms through which the light passes is the same. Such zone in the above described assembly is straight and parallel to the broad edges of the wedges; in such zone there is seen a black line called the obscure or central fringe. On either side of such fringe the differences in optical path introduced in each prism are not compensated exactly, since the thicknesses of the two prisms traversed by the light are not equal.

There thus exists a difference in phase between the principal vibrations and the interference between such vibrations corresponds to a luminous energy which is not equal to zero. Such difference in phase may have all the values included between 0 and $2\pi$ or a multiple of such values. The field of the compensator is furrowed with parallel fringes which are alternately dark and luminous, such fringes being equidistant and having a position defined by the given geometrical characteristics of the compensator. If the incident light is polychromatic, white light, for example, the central, obscure fringe is black but the lateral fringes are irisated.

If one places in advance of the fringe compensator, for example, a Babinet compensator, a birefringent object in such manner that the principal lines of the object are parallel to the axes of the compensator, it will be observed that in the apparatus the fringes undergo a translation perpendicular to the direction of the fringes. The amplitude of such translation is represented by the distance which may be observed between the initial position of one of the fringes and its final position. Such amplitude is proportional to the birefringence being measured.

It is possible to make the system of prisms in such manner that the difference in optical path represented by the shifting of a fringe from one end of the compensator to the other is 10 times the wave length of the light. In white light, at least one of the fringes (the central black fringes) is, in general, easy to identify without ambiguity (so far as the dispersion of the birefringence in the material being examined is weak). It can thus be seen that such a compensator allows a great field of measure.

In order to measure the amplitude of the translation of the system of the fringes, a known method consists in placing permanently in the plane of location of the fringes a sighting mark carrying divisions of a convenient scale, and to read upon such mark the number of divisions through which one of the fringes has been displaced.

The precision of such measurement depends upon the positions which the fringes occupy with respect to the divisions on the scale. The fringes are not defined by sharp boundaries, the degree of illumination between the center of a brilliant fringe and the center of a nearby dark fringe obeying, in effect, a sinusoidal law. The position of one fringe with respect to divisions of the scale can not be estimated with the same ease and the same sureness when the fringe falls between two such marks as when the fringe covers the scale mark. Experience shows that the maximum precision in estimating the position of a fringe is obtained when the division mark crosses the fringe in its middle: The eye estimates easily that the division of illumination is the same at the right as at the left of the scale mark. A known procedure making use of such phenomenon consists in using a sighting target having a single division mark in place of a complete scale, and in causing the coincidence of a fringe with such mark, the first time before introducing the specimen to be observed and then after the introduction of such specimen. In order to produce such coincidence, either the sighting mark is displaced with respect to fixed prisms, or the assembly of the prisms is displaced with respect to the sighting mark, or only one of the prisms is displaced. Measurement of the displacement of the fringe caused by the introduction of the object is deducted from the amount of movement which has to be imposed upon the movable part with respect to the fixed part in order that the fringe may return to its initial position. The fact that such measurement results from an operation in which one has brought the final conditions back to be identical with the initial conditions causes such method to be known as "the zero method."

Such method has many inconveniences. It is, first, much slower than a direct reading made upon the scale under visual observation; further, it requires the precise regulation of mechanical movement of means which drives the movable element indirectly, such as a screw and a nut, in order to produce a final precise measurement.

The inventor has found that the advantage of the precision which results from the method in which a mark on the scale is brought into coincidence with a fringe of the compensator may be maintained with a scale graduated with a plurality of marks, that is to say, a direct reading scale, and while dispensing with mechanical translation means. The amplitude of translation necessary to bring a fringe into exact coincidence with a mark on the scale is at most equal to one-half the distance between two successive marks on the scale, and this small translation may be secured by optical means by combining an elliptical compensator or quarter-wave plate with the fringe compensator.

Turning now to the drawings, there is shown in FIG. 1 an optical apparatus for measuring differences in phase of principal vibrations of a beam of polarized light with which the apparatus of the present invention may be advantageously employed. The apparatus of FIG. 1, with the exception of the measuring and analyzing elements thereof shown at the upper end of tube 30, is generally the same as that shown in applicant's prior U.S. Patent No. 2,995,060. Accordingly, the same reference characters are employed in describing elements of the present illustrative apparatus which are common to the apparatus of such patent. The described embodiment of apparatus shown is one wherein light is directed along a first tube, is deflected to impinge upon the upper surface of a specimen an to penetrate therein, is reflected by the specimen into a second tube parallel to the first tube, and is measured and enlarged at the upper and outer end of the second tube. It is to be understood, however, that the apparatus of the present invention may be employed to advantage with polariscopes of various other designs, including those wherein the optical train lies in a straight line, the light traveling through both surfaces of a specimen being examined in generally a straight line path.

In FIG. 1 a source of white light in the form of an electric light bulb 1 is positioned at the upper end of a first inclined tube 26 mounted in a frame 20. As shown, tube 20 is adjustable along its length in a bore 21 in frame 20 by means including a rack gear 13 disposed longitudinally of tube 26 and a pinion 14 meshing with such rack gear. Adjacent the lower end of tube 26 there is positioned a collimating lens 2 whereby the initially diverging light beam 27 from light source 1 is converted into a beam 28 of parallel light. Light beam 28 penetrates into a prism 3 positioned in tube 28 beyond lens 2, the prism having a rear inclined surface 3a which diverts beam 28 through an angle of 90° and directs it through a monochromatic filter 4 and plane polarizer 5, into incidence upon the upper face 7 of a transparent specimen 12 being examined. Specimen 12 may be, for example, a plate of glass.

Positioned in optical contact with the upper face 7 of specimen 12 is a prism 6 having such index of refraction relative to that of specimen 12 that the light beam 28 enters specimen 12 at an angle $\alpha$ with respect to the normal to the surface 7 of the specimen. The direction of the light beam against the lower surface 8 of specimen 12 is measured by the angle $\theta$, which is dependent on the angle $\alpha$. On the lower face 8 of the specimen 12 the light is totally or partially reflected, depending upon the value of the angle $\alpha$, and that part of the beam which is reflected again enters the prism 6 following a path symmetrical with that of entry and emergence thence into the ocular or viewing tube 30. Tube 30, as shown, is supported in a bore 22 in frame member 20, the tube 30 being parallel to tube 26.

Figure 2:
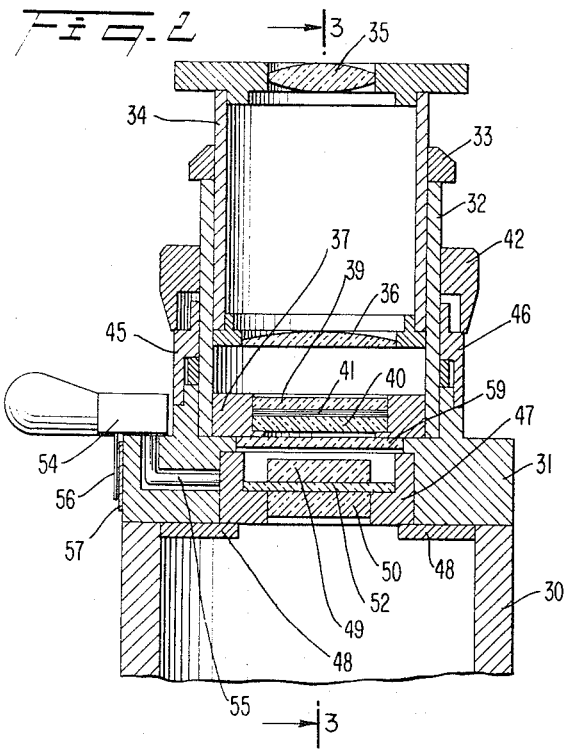
FIG. 2 is a view in axial section through the upper end of the observing and measuring section of the apparatus, the portion of the apparatus shown in FIG. 2 being turned so that its axis lies vertical.
Figure 3:
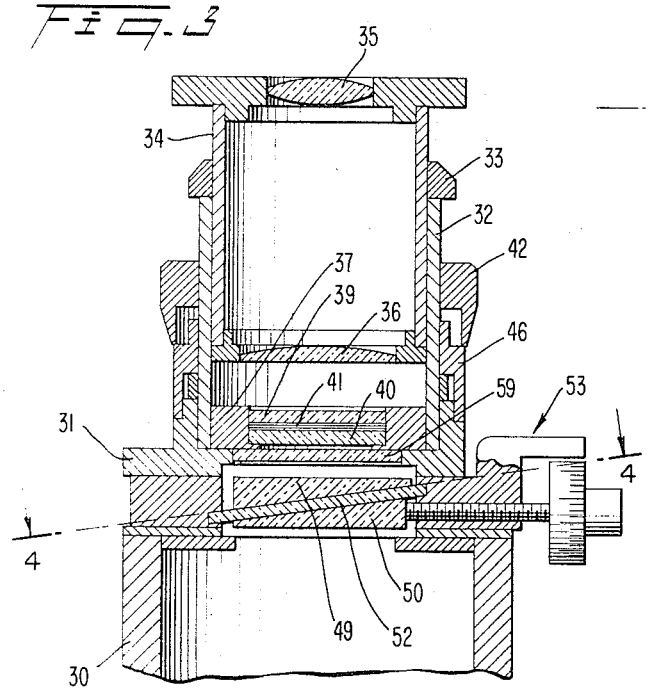
FIG. 3 is a view in axial section through the same portion of the apparatus shown in FIG. 2, the section of FIG. 3 being taken at right angles to that of FIG. 2 and along the line 3—3 of FIG. 2.
Figure 5:
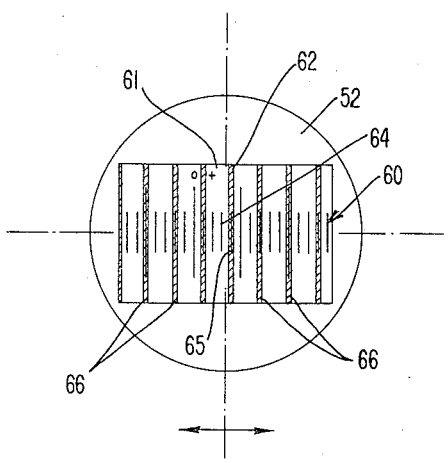
FIG. 5 is a view similar to FIG. 4 but with the fringes produced by the fringe compensator having been moved laterally by the apparatus of the invention so as to coincide with graduations on the scale.

As shown in FIGS. 1, 2, and 3, the barrel 30 has a thickened upper end portion 31 affixed thereto. Rising from portion or head 31 of barrel 30 and coaxial therewith is a relatively short tubular extension 32 of the barrel. Extension 32 is rotatably mounted in a seat provided on member 31, member 32 being conveniently rotated by a knurled ring 33 affixed to its upper end. Slidably mounted within extension 32 is a further tubular member 34 carrying a double convex lens 35 at its upper end and a plano-convex lens 36 at its lower end. Member 34 and lenses 35 and 36 function as an ocular piece, allowing an image of fringes produced at a fringe compensator 49, 50, to be described, to be seen by an operator. Member 34 is slidably relative to member 32, so that the ocular may be focused upon such fringes.

Secured to the lower end of barrel extension member 32 is a ring 37 having an annular central seat therein within which are mounted an upper glass plate 39, a polarizing member 41 in the form of a plastic polarizing sheet such as that known by the trademark "Polaroid," and a second, lower glass plate 40. The assembly of glass plates 39 and 40 for polarizing sheet 41 is thus turned with barrel extension 32 when the latter is rotated about its axis. A ring 42 secured to member 32 so as to turn therewith carries an index mark 44, as shown in FIG. 1. Cooperating with index mark 44 is a graduated scale 45 which is carried upon a ring-like member 46 which is mounted upon member 31 and held from rotation with respect thereto. The index mark 44 and scale 45 allow the angle through which tubular extension 32 and thus polarizer 41 have been turned.

Mounted in a guideway in member 31 centrally of barrel 30 is a slide 47 which is reciprocable for a limited distance in a direction normal to the plane of FIG. 2 and horizontally in the plane of FIG. 3. Slide 47, which is partially supported by strips 48 underlying its edges (FIG. 2) and at its ends by passages through member 31, has a central opening therethrough. Within such central opening there are mounted the confronting wedges or prisms 49 and 50 of a Babinet compensator, wedge 49 being mounted fixedly with respect to slide 47, whereas wedge 50 is adjustable relative thereto by a conventional adjusting means 53 carried on slide 47. Between wedges 49 and 50 of the Babinet compensator there is mounted a transparent plate 52 made, for example, of glass, plate 52 having a central elongated portion 61 bearing a graduated scale 60. It is to be understood that the angle of the wedges 49 and 50 of the compensator shown are exaggerated for clarity of illustration, and that the plate 52 will lie almost normal to the longitudinal axis of barrel 30. The longitudinal position of slide 47 may be adjusted within limits by means of a knob 54 which protrudes beyond one side of member 31, such knob being connected to slide 47 by means of an angular arm 55 slidably received within a correspondingly shaped groove in member 31. The horizontal position of slide 47 may, if desired, be indicated by a suitable pointer or index mark 56 attached to knob 54, such pointer cooperating with a fixed graduated scale 57 mounted on member 31.

Fixedly positioned in element 31 is an elliptical compensator 59. Elliptical compensators, often called either Sénarmont (Sénarmont H., Ann. Chem. Phys. (2), 73, 337 (1840)) and Friedel (Friedel G., Bull. Soc. Min. France, 16, 19–33 (1893)), allow the bringing of an elliptical vibration, which in general emerges from a birefringent object, to a rectilinear vibration; the angle which such linear vibration makes with the axes of initial elliptical vibration is proportional to the difference in phase introduced by traversing the birefringent object. Compensator 59 is in the form of a quarter wave length plate positioned with its neutral or principal lines at 45° with respect to those of the Babinet compensator.

The optical train of the apparatus illustrated in FIGS. 1, 2, and 3 may be schematically depicted in a simplified manner as shown in FIG. 6. The polarizer 5, the specimen 12, the Babinet compensator 49, 50, the sighting target plate 52, the quarter wave length plate 59, and the analyzer 41 are positioned at fixed distances along the optical axis of the apparatus, as shown. The optical axis 67 of polarizer 5 is shown as being disposed horizontally. The first and second optical axes 69 and 70, respectively, of specimen 12 are preferably disposed at 45° with respect to the axis 67. The principal axes 71 and 72 of the Babinet compensator are parallel to the respective axes of the specimen 12, that is to say, at 45° with respect to the direction of polarization. The quarter wave length plate 59, disposed between the fringe compensator and the analyzer, has one of its principal axes, designated 74, parallel to the direction of polarization 67 of the polarizer 5. The other principal axis, designated 75, of element 59 is disposed perpendicular to the direction of polarization of the polarizer 5. The analyzer 41, which may be made of a Nicol prism or a sheet of the plastic material known by the trademark "Polaroid," is disposed at the end of the optical train. Such analyzer may be turned in its plane so that its direction of polarization may be made to assume any desired angle with a direction normal to the direction of polarization. As we have seen, such angle may be measured by use of the graduated scale 45 on barrel portion 46 and the index mark 44 on ring 42.

Figure 4:
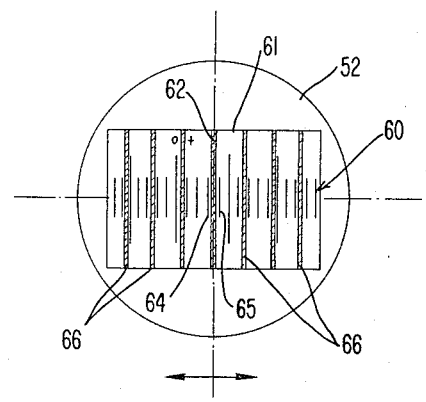
FIG. 4 is a view in plan of a transparent measuring scale associated with the fringe compensator of the apparatus, the view being taken from the line 4—4 of FIG. 3, the view showing a set of fringes produced by the fringe compensator and superimposed on the scale.

In using the apparatus of FIGS. 1, 2, and 3, the operator places the specimen to be measured in the optical train, as schematically indicated in FIG. 6. With the specific apparatus shown, this consists in placing the device of FIG. 1 on a specimen 12. With the light 1 turned on, the operator crosses the analyzer 41 with the polarizer 5, thereby producing a condition at the fringe analyzer, which exists through the ocular, similar to that illustrated in FIG. 4. As there shown, the black fringe occupies a certain position between two marks 64 and 65 on the graduated scale 60 of plate 52. The operator notes the position of index mark 44 on scale 45. Thereupon he turns the analyzer so that the black fringe 62 is caused to travel into coincidence with the nearer mark, in this case mark 65, on scale 60. Such new position of the analyzer is then read upon the sale 45. The known predetermined relationship between the scales 45 and 60 allows the operator to add or subtract, as the case may be, birefringence from the birefringence corresponding to mark 65 on the scale, the result of such calculation yielding the exact value of the birefringence of the specimen.

It is preferred that scales 45 and 60 be so related that turning the analyzer through one division on scale 45 is the equivalent of moving the black fringe through a distance which is an aliquot division of the distance between successive marks on scale 60. Most conveniently, scales 45 and 60 are so related that the rotation of the analyzer through 10 divisions on scale 45 will produce a translation of the black fringe which is equal to one division on scale 60.

According to a well-known optical principle, called the principle of inverse return of light, the light phenomena remain unchanged when, without changing the order of the optical elements traversed by the light, one changes the direction of travel of the light. Such principle is illustrated in the alternative arrangement of the elements in the optical train schematically shown in FIG. 7. In such figure the specimen 12 and the quarter wave length plate 59 have been interchanged as to their position in the train, light passing in that order from lamp 1 through polarizer 5, quarter wave length plate 59, the assembly of Babinet compensator and sighting plate 52, the specimen 12, and the analyzer 41. In the arrangement shown in FIG. 7 the analyzer 41 is mounted fixed from rotation, whereas the polarizer 5 is rotatably mounted and is associated with angle-measuring means (not shown) such as the index mark 44 and the scale 45 employed in the first described embodiment. The apparatus of FIG .7 operates in generally the same manner as that of the first described embodiment, rotation of polarizer 5 in the second embodiment being employed to bring the black fringe into coincidence with the nearest mark on the scale on sighting plate 52.

The apparatus of the invention is particularly characterized by the ease with which it is used and the accuracy of measurements made therewith. The conveniences above described of prior apparatus of the same general type are overcome; there is no necessity, when using the apparatus of the invention, of estimating the position of the black fringe in terms of the fraction of the interval at which it lies between two marks on the sighting target. Instead, the black fringe can be brought very accurately into exact coincidence with the graduation of the scale which precedes or follows it, and the distance of translation of the black fringe to produce such result can be very accurately determined.

Although only two embodiments of apparatus for measuring differences in phase of principal vibrations of a beam of polarized light have been illustrated in the accompanying drawings and desscribed in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In an optical instrument for measuring path differences introduced in polarized light by a substantially planar surfaced specimen, means including a plane polarizer operable to project plane polarized light into a specimen with its plane of polarization inclined at an angle to the plane of the surface of the specimen, whereby the resulting light rays emerging from the specimen are elliptically polarized, a fringe compensator, an analyzer, an ocular, means mounting said compensator and analyzer in the path of said emerging light rays, to be traversed thereby in the order mentioned, a quarter-wave plate positioned in the path of the rays, between said fringe compensator and said analyzer, the two principal axes of said quarter-wave plate being, respectively, parallel with and at 90° to the direction of polarization of said plane polarizer, said mounting means enabling rotation of said analyzer only about the axis of the rays traversing the same, first scale means cooperating with said mounting means to measure the degree of rotation thereof, and the second scale means fixed with said fringe compensator and visible in the field of view of said ocular, in superposed relation with and having linearly-spaced graduations parallel with the fringes produced by said compensator in the field of view, the spacing of the graduations of said second scale means having a known relation to the spacing of the graduations of said first scale means so that the fringes and graduations of the second scale means may be superimopsed and the position of the fringes determined by the relative angular position of the analyzer and the compensator graduations.

2. The instrument of claim 1, said fringe compensator being translatable in a direction normal to the path of said emerging rays and to the fringes produced thereby in the field of view of said analyzer, and indicator means operated by and in response to said translation, to measure the same.

3. In an instrument for measuring path differences introduced in polarized light by a specimen, a frame having first and second spaced parallel bores, a prism having two faces forming an angle of 90° mounted in said frame with its third face at 45° to the axes of said bores, said face being adapted to rest upon a specimen in surface contact therewith, a first tube mounted in said first bore for axial adjustment therealong, means comprising a plane polarizer fixed with said first tube to project plane polarized light onto one face of said prism, a second tube in said second bore to receive light after it has passed through the specimen, been reflected on the opposite face of the specimen and passed again into said prism and through its other face, a fringe compensator, a quarter-wave plate, and an analyzer all mounted at the outer end of said second tube to be traversed in the order mentioned by light transmitted through said prism, said second tube having a central optical axis, said quarter-wave plate being fixed in position across said axis, with its two principal axes respectively parallel with and at 90° to the direction of polarization of said plane polarizer, first means carried by said second tube and mounting said compensator for translation in a plane normal to said axis and at 45° to the axes of said quarter-wave plate, second means carried by said second tube and mounting said analyzer for rotation about said axis, and indicator means operated by and in response to said rotation for measuring the same.

4. The instrument of claim 3, said first means comprising a head fixed to the outer end of said second tube and forming a guideway guiding said compensator in translation, said second means comprising a third tube mounted on said head coaxial of and rotatable about said axis, said analyzer being fixed in the end of said third tube adjacent said head, and an ocular mounted in the other end of said third tube for adjustment along said axis.

References Cited
UNITED STATES PATENTS

| | | | |
|---|---|---|---|
| 2,460,515 | 2/1949 | Lowber et al. | 88—14 X |
| 2,995,060 | 8/1961 | Acloque | 88—14 |
| 3,060,808 | 10/1962 | Koester | 88—65 |
| 3,096,175 | 7/1963 | Zandman | 88—14 |

FOREIGN PATENTS

| | | |
|---|---|---|
| 946,695 | 12/1948 | France. |
| 1,138,768 | 2/1957 | France. |
| 741,557 | 12/1955 | Great Britain. |

OTHER REFERENCES

Rothen: The Review of Scientific Instruments, vol 16, No. 2, February 1945, pp. 26–30.

The Glass Industry, vol. 41, No. 1, January 1960, pp. 36 and 46–47.

Emberson, Richard M.: "The Polarimetric Determination of Optical Properties," Journal of the Optical Society of America, vol. 26, No. 12, December 1936, pp. 443–449.

JEWELL H. PEDERSEN, *Primary Examiner.*

J. K. CORBIN, T. L. HUDSON, O. B. CHEW,
*Assistant Examiners.*